Feb. 5, 1946. C. LORBER 2,394,247
KNOWLEDGE TESTING DEVICE
Filed Jan. 23, 1945 2 Sheets-Sheet 1
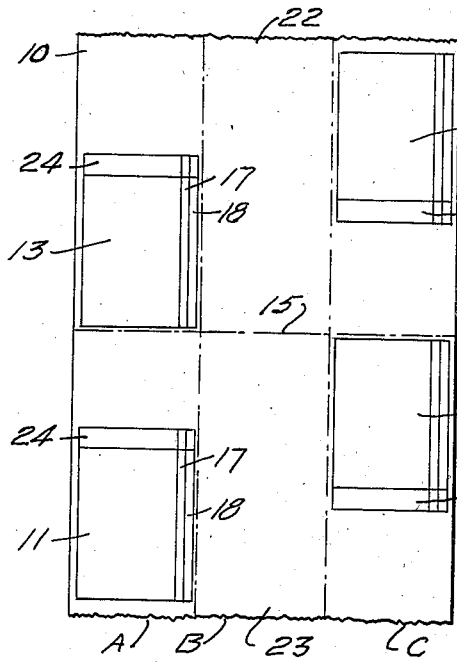
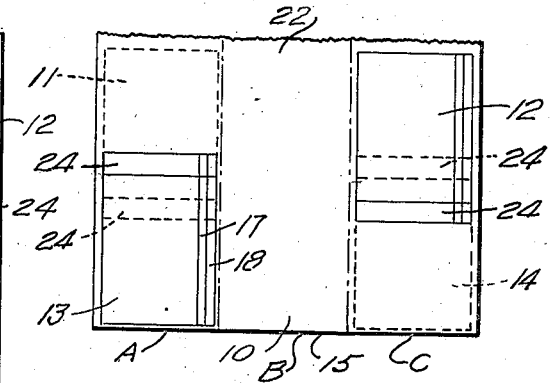
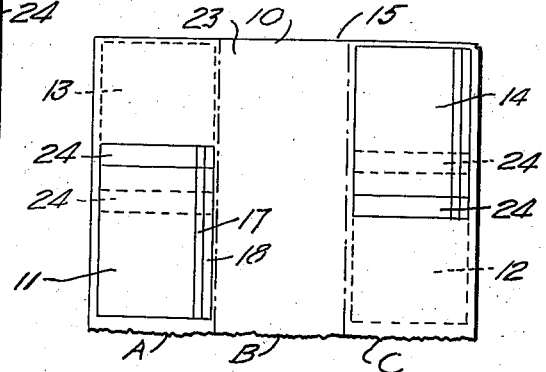
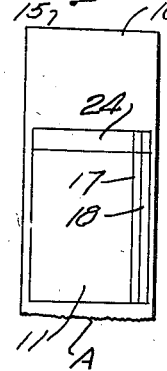
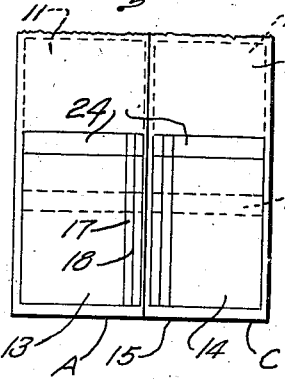
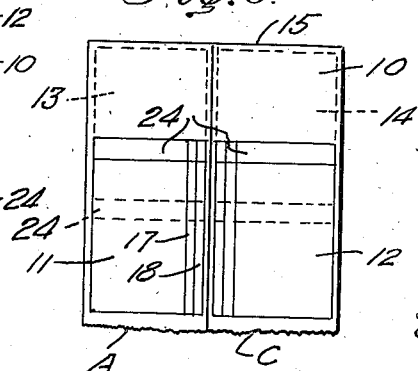
Inventor
Charles Lorber,
By [signature]
Attorney Feb. 5, 1946.  C. LORBER  2,394,247

KNOWLEDGE TESTING DEVICE

Filed Jan. 23, 1945   2 Sheets-Sheet 2

Fig. 7.

| PROBLEM NUMBER | WRITTEN ANSWERS | | PROBLEM NUMBER | CORRECT ANSWERS | |
|---|---|---|---|---|---|
| 1 |  | WHEN YOU SUBSCRIBE TO A BI-MONTHLY MAGAZINE, YOU WILL RECEIVE TWO ISSUES MONTHLY. | 1 | F | ONE ISSUE EVERY TWO MONTHS. |
| 2 |  | THERE ARE TWO CUPS OF BUTTER IN A POUND. | 2 | T | TRUE WELL PACKED. |
| 19 |  | THERE ARE THREE SYLLABLES IN THE WORD NIAGARA. | 19 | F | FOUR SYLLABLES NI-AG-A-RA. |
| 20 |  | PEPPER IS OBTAINED FROM A BARK OF A TREE. | 20 | F | FROM A SEED. |

Fig. 8.

| PROBLEM NUMBER | WRITTEN ANSWERS | | PROBLEM NUMBER | CORRECT ANSWERS | |
|---|---|---|---|---|---|
| 1 |  | THERE ARE THREE MAIN RACIAL DIVISIONS. | 1 | T | WHITE, YELLOW AND BLACK RACES. |
| 19 |  | UNIVERSITY OF CALIFORNIA IS IN LOS ANGELES. | 19 | F | IN BERKELEY CALIFORNIA. |
| 20 |  | RAYON DOES NOT CONTAIN SILK. | 20 | T | IT IS A SUBSTITUTE FOR SILK. |

Inventor
Charles Lorber,
By
Attorney

Patented Feb. 5, 1946

2,394,247

UNITED STATES PATENT OFFICE 2,394,247

KNOWLEDGE TESTING DEVICE

Charles Lorber, Louisville, Ky.

Application January 23, 1945, Serial No. 574,084

4 Claims. (Cl. 283—1)

This invention relates to a knowledge testing device and has special reference to a knowledge testing device to be used in newspapers.

It is quite common, in newspapers and other periodicals, to have on one page a series of problems and on some other page a series of answers to these problems. And the idea in this is that in connection with the series of problems there are provided spaces in which the person using the device inserts an answer or an indication of what the answer should be. Then such person turns over the page of the periodical until he finds the page on which the correct answers are given and, by referring backward and forward between the problems and answers, he determines how many of the problems he has answered correctly. In any publication or periodical such a process involves repeated turning back and forth of pages. In newspapers this becomes a specially difficult proposition because of the fact that newspaper sheets are large, the fact that it is difficult to find on any sheet that part which correlates with a corresponding part on another sheet and it is difficult to properly determine the relationship of two such parts.

The principal object of the present invention is to provide a knowledge testing device especially adapted for use in connection with newspapers.

A second important object of the present invention is to enable one undertaking to answer such problems to fold the newspaper so that the answers to the particular problems will be positioned opposite the problem submitted.

A third important object of the present invention is to provide a knowledge testing device of this sort wherein a plurality of sets of problems and a plurality of sets of answers thereto may be printed on the newspaper in such manner that the ordinary folding of the paper may bring each set of answers into coaptation.

With the above and other objects in view the invention consists in general of certain novel details of construction and combinations of parts hereinafter fully described, illustrated in the accompanying drawings, and particularly claimed.

In the accompanying drawings,

Fig. 1 illustrates diagrammatically a single newspaper sheet whereon a plurality of problems and answers are arranged so that, upon the usual folding of the sheet, the problems and answers will be brought into coaptation.

Fig. 2 is an illustration showing in diagram the first folding of the newspaper sheet with the lower part folded behind the upper part.

Fig. 3 is a view similar to Fig. 2, but with the newspaper, as arranged in Fig. 2 shown turned over.

Fig. 4 is a view showing the newspaper folded into what may be termed a single panel.

Fig. 5 is a view showing Fig. 2 folded to present two panels having coaptive problems and answers arranged in side by side positions.

Fig. 6 is a view showing Fig. 3 folded to present two panels also showing questions and answers in coaptive position.

Fig. 7 is an enlarged view of a portion of Fig. 5.

Fig. 8 is an enlarged view of a portion of Fig. 6.

In the arrangement as here shown one page, such as 10 of the newspaper has printed thereon at 11 a certain arrangement of problems hereinafter to be desribed, these problems being preferably located toward the lower left hand corner of the sheet or page. Also the answers to these problems are arranged as at 12 in a rectangle wherein the typing is inverted. Furthermore there may be a second series of problems 13 and answers 14 in rectangles on each side of a middle line 15 between the top and bottom margins of the newspaper leaf. In this case these answers are printed at 14 in inverted position.

In each of these cases the rectangle containing the problems include a series of rectangular spaces 16 arranged in the collection, one above the other, containing the problem. To the right of each of these problem spaces is a column of figures 17 giving the number of the problem and next to the right of that is a series of blank spaces 18 for written answers, one such space being opposite each column. The problem spaces occur on the upper or lower half of the leaf. These problem spaces are preferably at the left hand side of the leaf. Again in each of the answer rectangles there is provided a series of spaces 19 containing the proper answers to the problems in the spaces 16 and to the left of the series of spaces 19 are a series of spaces 20 containing the numbers of such answers and corresponding in number to the answers in column 17. Furthermore to the left of the column 20 is a column of answers 21 containing indices of the true answers. Here it is to be understood that the answers in the spaces 15 are explanatory of the correct answer given in the column 21.

It is here to be understood that what is meant by problems is any statement or proposition which may be answered as either true or false and that the indicia in column 21 is preferably only the letter "F" or the letter "T" as may be the case to indicate whether the statement or problem in the space 16 is false or true.

It is to be noted that the answers and all matters relating thereto are printed upsidedown in the spaces 12 and 14. This is so that, when the sheet is folded over on the median line 15 to bring the upper part 22 behind the lower part 23 the rectangles 12 and 13 will be inverted so that the headings 24 of the rectangles 11 and 14 will lie opposite each other in the double sheet. Obviously if the sheet, in its double condition is then reversed as indicated in Fig. 3 the rectangles 11 and 12 will be inverted while the rectangles 13 and 14 are in erect position.

Now the sheet may be folded laterally as in three panels A, B and C so that the panel A is on top or the sheet may be folded so that the panel C is turned over against the panel B as shown in Fig. 3 with the entire sheet in position as shown in Fig. 2. On the other hand if the sheet is folded into the position shown in Fig. 3 the same folding of the panel C on the panel B will result in the juxtaposition of the problem 13 and answers 14 as shown in Fig. 6.

Thus each answer is brought opposite the problem and in the event that the fold is not accurate it may be adjusted so that the like problem numbers lie opposite each other as clearly shown in Figs. 7 and 8. By this means one does not have to refer from page to page after filling in the answers in the written answer column but such answers may be compared with the correct answers at the right of the written answers.

It is to be noted that what is meant by problems is not confined to any indication of whether the statement made in the problem is true or false but may have a wide variety of arrangement. For instance in one of the spaces 16 may consist of a mathematical statement such as "2×3×4 equals what?" With the correct answer given as column 21. On the other hand the problem may present a selective answer, as for instance, a problem may state that "a number of cows together are known as a (1) covey, (2) nest, (3) herd. In this case the true answer as given in problem 21 would be 3. Other wide varieties of test problems would be apparent to persons skilled in the art and other indications of the correct answers.

What is claimed is:

1. In a knowledge testing, a news sheet having at one side a vertical series of problems, said series being on one side of a line dividing the sheet into upper and lower halves, said sheet having on the other side of said line and spaced equally therefrom a series of answers to said problems printed in inverted position, said sheet being foldable vertically to bring the series of problems and series of answers into lateral alinement and being foldable on vertical lines laterally to bring the series of problems and series of answers into lateral juxtaposition.

2. In a knowledge testing, a news sheet having at one side a vertical series of problems, said series being on one side of a line dividing the sheet into upper and lower halves, said sheet having on the other side of said line a series of answers to said problems printed in inverted position, said series of problems and series of answers being equally spaced from said line, said sheet being foldable vertically to bring the series of problems and series of answers into lateral alinement and being foldable laterally on vertical lines to bring the series of problems and series of answers into lateral juxtaposition.

3. In a knowledge testing, a news sheet having at one side a vertical series of problems, said series being on one side of a line dividing the sheet into upper and lower halves, said sheet having on the other side of said line a series of answers to said problems printed in inverted position and spaced equally from said fold line, said series of problems having at its side a series of appropriately designated spaces for the insertion of supposedly correct answers, said sheet being foldable vertically to bring the series of problems and series of answers into lateral alinement and being foldable laterally on vertical lines to bring the series of problems and series of answers into lateral juxtaposition.

4. In a knowledge testing, a news sheet having at one side a vertical series of problems, said series being on one side of a line dividing the sheet into upper and lower halves, said sheet having on the other side of said line a series of answers to said problems printed in inverted position, said series of problems and series of answers being equally spaced from said line, said series of problems having at its side a series of appropriately designated spaces for the insertion of supposedly correct answers, said sheet being foldable vertically to bring the series of problems and series of answers into lateral alinement and being foldable laterally on vertical lines to bring the series of problems and series of answers into lateral juxtaposition.

CHARLES LORBER.